United States Patent
Fang

(10) Patent No.: US 9,575,202 B2
(45) Date of Patent: Feb. 21, 2017

(54) METHODS AND DEVICES FOR EXTRA-DEEP AZIMUTHAL RESISTIVITY MEASUREMENTS

(71) Applicant: BAKER HUGHES INCORPORATED, Houston, TX (US)

(72) Inventor: Sheng Fang, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 32 days.

(21) Appl. No.: 13/974,543

(22) Filed: Aug. 23, 2013

(65) Prior Publication Data

US 2015/0054513 A1  Feb. 26, 2015

(51) Int. Cl.
*G01V 3/26* (2006.01)
*G01V 3/28* (2006.01)

(52) U.S. Cl.
CPC ..................... *G01V 3/28* (2013.01)

(58) Field of Classification Search
CPC .............. G01V 3/28; G01V 3/30; G01V 3/24; G01V 3/20; E21B 47/01
USPC ............ 324/346, 333, 338–343; 702/7, 185; 73/152.03; 177/45–48; 166/250–253
See application file for complete search history.

(56) References Cited

U.S. PATENT DOCUMENTS

| | | | |
|---|---|---|---|
| 5,668,475 A * | 9/1997 | Orban et al. ................ | 324/339 |
| 6,509,738 B1 * | 1/2003 | Minerbo et al. ............ | 324/339 |
| 6,819,111 B2 * | 11/2004 | Fanini et al. ............... | 324/339 |
| 6,900,640 B2 * | 5/2005 | Fanini et al. ............... | 324/339 |
| 6,937,021 B2 | 8/2005 | Rosthal | |
| 7,167,006 B2 | 1/2007 | Itskovich | |
| 7,719,282 B2 * | 5/2010 | Fanini et al. ............... | 324/338 |
| 7,804,309 B2 * | 9/2010 | Cummins .................... | 324/694 |
| 8,085,050 B2 * | 12/2011 | Bittar et al. ................ | 324/339 |
| 8,207,738 B2 * | 6/2012 | Wang ........................... | 324/333 |
| 8,762,107 B2 * | 6/2014 | Pelegri et al. .............. | 702/185 |
| 2003/0056984 A1 | 3/2003 | Smith et al. | |

(Continued)

FOREIGN PATENT DOCUMENTS

| | | |
|---|---|---|
| CA | 2811633 A1 | 3/2012 |
| EP | 2606385 A1 | 6/2013 |

(Continued)

OTHER PUBLICATIONS

Davydycheva, S.,"3D modeling of new-generation (1999-2010) resistivity logging tools," The Leading Edge(2010),29 (7):780-10; http://dx.doi.org/10.1190/1.3462778.

(Continued)

*Primary Examiner* — Son Le
*Assistant Examiner* — Akm Zakaria
(74) *Attorney, Agent, or Firm* — Mossman, Kumar & Tyler, PC

(57) ABSTRACT

An apparatus for estimating at least one parameter of interest of an earth formation includes a first sub and a second sub positioned along the conveyance device. The first sub and the second sub cooperate to generate at least one main component measurement and only the second sub is configured to generate at least one cross-component measurement. A method includes conveying a first sub and a second sub along a wellbore formed in the earth formation using a conveyance device, using the first sub and the second sub to generate at least one main component measurement, and using only the second sub to generate at least one cross-component measurement.

19 Claims, 3 Drawing Sheets

(56) References Cited

U.S. PATENT DOCUMENTS

| | | |
|---|---|---|
| 2003/0137301 A1 | 7/2003 | Thompson |
| 2004/0117120 A1* | 6/2004 | Frenkel et al. .................... 702/7 |
| 2004/0123655 A1* | 7/2004 | MacPherson .............. 73/152.03 |
| 2006/0214664 A1* | 9/2006 | Folberth et al. .............. 324/339 |
| 2009/0138202 A1 | 5/2009 | Tang et al. |
| 2010/0007348 A1* | 1/2010 | Fang et al. .................... 324/339 |
| 2010/0082255 A1 | 4/2010 | Davydycheva et al. |
| 2011/0140701 A1 | 6/2011 | Legendre et al. |
| 2012/0051189 A1* | 3/2012 | Signorelli et al. ............ 367/177 |
| 2012/0242342 A1* | 9/2012 | Rabinovich et al. ......... 324/338 |
| 2013/0024119 A1* | 1/2013 | Tabarovsky et al. ............. 702/7 |
| 2013/0043884 A1 | 2/2013 | Le et al. |
| 2014/0167767 A1* | 6/2014 | Herrera et al. ................ 324/339 |

FOREIGN PATENT DOCUMENTS

| | | |
|---|---|---|
| WO | 2005064362 A1 | 7/2005 |
| WO | 2008036564 A2 | 3/2008 |
| WO | 2009046193 A1 | 4/2009 |
| WO | 2009089519 A1 | 7/2009 |
| WO | 2013025528 A3 | 4/2013 |

OTHER PUBLICATIONS

PCT/US2014/052333—International Search Report dated Dec. 10, 2014.

* cited by examiner

METHODS AND DEVICES FOR EXTRA-DEEP AZIMUTHAL RESISTIVITY MEASUREMENTS

FIELD OF THE DISCLOSURE

The disclosure is related generally to the field of electrical resistivity well logging methods.

BACKGROUND OF THE DISCLOSURE

To obtain hydrocarbons such as oil and gas, well boreholes are drilled by rotating a drill bit attached at a drill string end. The drill string may be a jointed rotatable pipe or a coiled tube. Boreholes may be drilled vertically, but directional drilling systems are often used for drilling boreholes deviated from vertical and/or horizontal boreholes to increase the hydrocarbon production. Modern directional drilling systems generally employ a drill string having a bottomhole assembly (BHA) and a drill bit at an end thereof that is rotated by a drill motor (mud motor) and/or the drill string. A number of downhole devices placed in close proximity to the drill bit measure certain downhole operating parameters associated with the drill string. Such devices typically include sensors for measuring downhole temperature and pressure, tool azimuth, tool inclination. Also used are measuring devices such as a resistivity-measuring device to determine the presence of hydrocarbons and water. Electromagnetic induction and wave propagation logging tools are commonly used for determination of electrical properties of formations surrounding a borehole. These logging tools give measurements of apparent resistivity (or conductivity) of the formation that, when properly interpreted, reasonably determine the petrophysical properties of the formation and the fluids therein.

The present disclosure is directed resistivity tools that provide enhanced operation and functionality.

SUMMARY OF THE DISCLOSURE

In one aspect, the present disclosure provides an apparatus for estimating at least one parameter of interest of an earth formation. The apparatus may include a first sub and a second sub positioned along the conveyance device. The first sub and the second sub cooperate to generate at least one main component measurement and only the second sub is configured to generate at least one cross-component measurement.

In another aspect, the present disclosure provides a method for estimating at least one parameter of interest of an earth formation. The method may include conveying a first sub and a second sub along a wellbore formed in the earth formation using a conveyance device, using the first sub and the second sub to generate at least one main component measurement, and using only the second sub to generate at least one cross-component measurement.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

This disclosure generally relates to exploration for hydrocarbons involving electromagnetic investigations of a borehole penetrating an earth formation. In aspects, the present disclosure provides a "looking deep" azimuth resistivity tool formed on a single sub or joint of a tool string with a medium spacing. This configuration reduces the complexity associated with synchronization of signals. Embodiments of the present disclosure may be implemented with relatively less engineering work and without a significant loss of penetration depth. One illustrative arrangement uses two subs for transmitters and receivers that can be arranged in a controllable larger spacing (e.g., greater than 10 meters) for looking deep (i.e., radially outward from the longitudinal axis of the tool a distance 10 meters or greater) and also looking "ahead of the bit" or axially along the trajectory of the wellbore.

Figure 1:
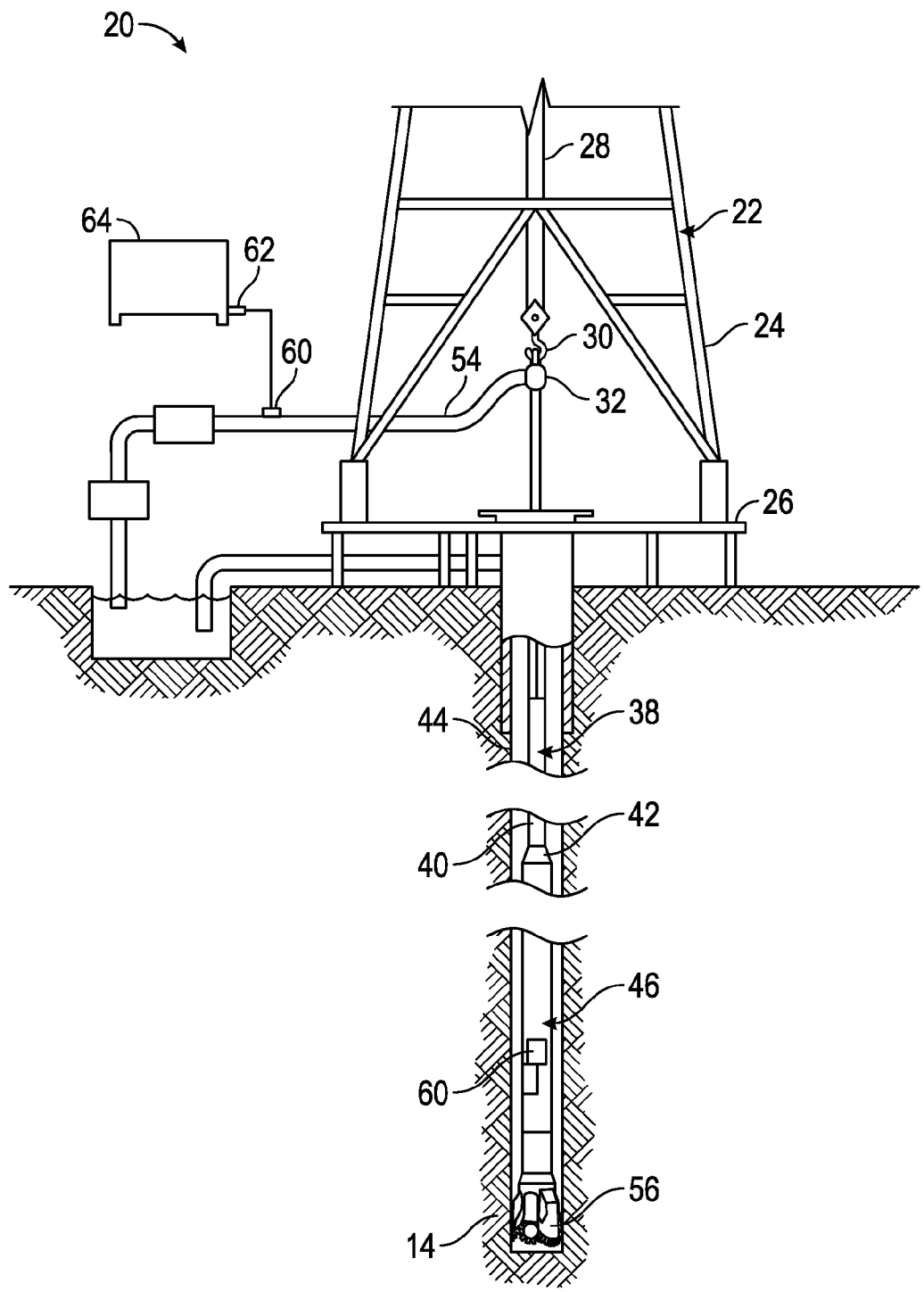
FIG. 1 shows a schematic of a drilling system using a resistivity tool according to one embodiment of the present disclosure.

Referring now to FIG. 1, there is shown an exemplary drilling system 20 suitable for use with the present disclosure. As is shown, a conventional rig 22 includes a derrick 24, derrick floor 26, draw works 28, hook 30, and swivel 32 A conveyance device such as a drillstring 38 which includes drill pipe section 40 and drill collar section 42 extends downward from rig 22 into a wellbore 44. In other embodiments, at least some of the conveyance device may include a non-rigid carrier such as coiled tubing. Drill collar section 42 preferably includes a number of tubular drill collar members which connect together, including a measurement-while-drilling (MWD) subassembly including a number of sensors and cooperating telemetry data transmission subassembly, which are collectively referred to hereinafter as "MWD system 46". The drill string 38 further includes a drill bit 56 adapted to disintegrate a geological formation and known components such as thrusters, mud motors, steering units, stabilizers and other such components for forming a wellbore through the subterranean formation 14. Other related components and equipment of the system 20 are well known in the art and are not described in detail herein. The MWD system 46 may include a resistivity tool 60, which is shown in greater detail in FIG. 2.

Figure 2:
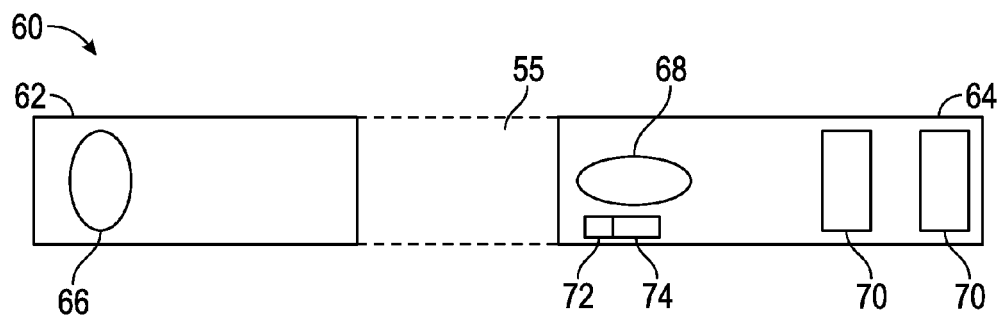
FIG. 2 shows a schematic close up of a resistivity tool according to one embodiment of the present disclosure.

FIG. 2 shows one embodiment of resistivity tool 60 in accordance with the present disclosure. The tool 60 may be configured for deep azimuthal investigation by operating at a low frequency. As used herein, a low frequency may be a frequency at or below 500 KHz. As used herein, a "deep" investigation is an investigation of the formation at least ten meters radially away from the wellbore. The resistivity tool 60 includes a first sub 62 and a second sub 64. The first sub 62 and the second sub 64 cooperate to generate at least one main component measurement and the second sub is configured to generate at least one cross-component measurement. The main component may be one of: (i) a co-axial component, and (ii) a co-planar component.

The subs 62, 64 may be separated by unrelated equipment 55. By unrelated, it is meant that the equipment does not operationally interact with the receivers and transmitters of the subs 62, 64 (e.g., emit or detect signals associated operation of the subs 62, 64). The term "sub" refers to a unitary body of oil field well equipment and may be a tool string, a housing, support, frame, enclosure, or carrier. In some conventions, a standard sub may have a length of 30 feet or a length of 10 meters. In one sense, a "sub" is sufficiently functionally and structurally integral to enable onboard equipment share the same electronic components; e.g., a clock for synchronizing measurements.

The first sub 62 may include one or more Z-transmitters 66, e.g., a transmitter coil directed along the "co-axial" of the sub 62. The second sub 64 may include one or more X-transmitters 68 and one or more Z-receivers 70. The X-transmitters 68 and the Z-receivers 70 may be disposed toward the opposing ends of the sub 64 to maximize the axial space separating these two components. In one illustrative configuration, the spacing may be six or more meters. However, this spacing and relative positioning is small enough to allow a synchronizing circuit 72, which may include a clock 74, to provide a synchronizing signal for X-transmitters 68 and one or more Z-receivers 70. The Z-transmitter and the Z-receiver are on different subs and may be separated by an axial distance of ten meters or more.

The transmitters 66,68 may be placed with their normals substantially orthogonal to each other, in the order shown. The transmitters 66, 68 induce magnetic fields in two spatial directions. The letters ("X," "Z") indicate an orthogonal system substantially defined by the directions of the normals to the transmitters 66, 68. The z-axis is chosen to be substantially parallel to the longitudinal axis of the tool 60, while the x-axis is in a perpendicular direction lying in the plane transverse to the longitudinal axis. The receivers 70 are aligned along the orthogonal system defined by the transmitter normals. The orientation of the transmitters and receivers remain fixed with respect to the tool 60. The multi-component tool in horizontal configuration is sensitive to the anisotropic formation and tool location as well as the rotation of the tool 60 around its axis.

The first sub 62 and the second sub 64 cooperate to generate co-axial measurements. This is possible by using the Z-transmitter of the first sub 62 and the Z-receiver of the second sub 64. By "co-axial," it is meant measurement of the "ZZ" component of a magnetic field. In one configuration, differential axial measurements of the Z transmitter induced magnetic field that have been taken by the closely spaced Z receivers may be used to eliminate the need for synchronization to estimate the ZZ component. The respective receivers may be used to determine an axial signal as follows: Amplitude ratio=$A_{R2}/A_{R1}$ (Phase difference=$\varnothing_{R2}-\varnothing_{R1}$). The second sub 64 is configured to generate cross-component measurements. This is possible by using the X-transmitter and the Z-receiver of the second sub 64. By "cross-component," it is meant measurements of the "ZX" component of the magnetic field. Thus, the first sub 62 is not used to generate a cross-component measurement. These measurements may be in the frequency domain.

Referring now to FIGS. 1 and 2, during use, the drilling system 10 forms the wellbore 44 by rotating the drill string 38. At the same time, the resistivity tool 60 rotates while taking resistivity measurements of the formation being traversed by the drill string 38. The first sub 62 and the second sub 64 cooperatively generate co-axial measurements while the second sub 64 generates cross-component measurements. Advantageously, a single clock 74 associated with the second sub 64 may be used to synchronize the cross-component measurements generated by the second sub 64. Further, the first sub 62 and the second sub 64 can be arranged at a much larger spacing for a differential main component measurement to enhance looking deeper.

Embodiments of the present disclosure may also be configured to use two subs to measure "XX" components and use one sub to measure only the cross-components of the magnetic field. Thus, a common clock may be used for all the cross-component measurements. Additionally, embodiments of the present disclosure may include sub configurations wherein the transmitters and receivers are arranged such that the first sub has two transmitters (either X or Z) while the second sub has at least one receiver (either X or Z) and at least one transmitter (either Z or X or Y). Thus, the second sub may use not only one cross-component but also other cross-components and main components. Illustrative non-limiting variants are discussed below in connection with FIGS. 3A-3D. These embodiments all include a first sub 62, a second sub 64, and a synchronization circuit 72 that has a clock 74. In all these embodiments, the transmitters and receivers are arranged such that synchronization is not needed for the measurements using both subs 62, 64. Rather, the measurements using both subs 62, 64 are differential measurements. The measurements wherein synchronization is used are made using only the sub 64. It should be understood that the terms "first" and "second" are used merely for ease of discussion. This terminology is not intended to limit the number of subs or to identify a particular spatial orientation for the subs.

Figure 3A:
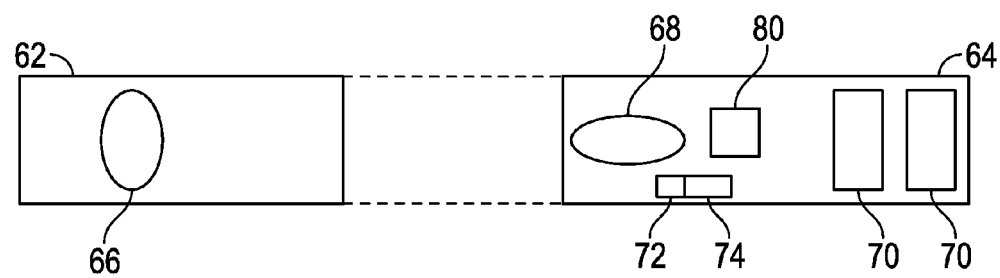
FIG. 3A-D show various embodiments of resistivity tools according to the present disclosure.

Referring to FIG. 3A, the first sub 62 may include a Z-transmitter 66. The second sub 64 may also include X-receivers 80 in addition to a Z-receiver 70 and the X-transmitter 68. Thus, the second sub 64 may be configured to make measurements of the "XX" magnetic component in addition to the cross-component measurements.

Figure 3B:
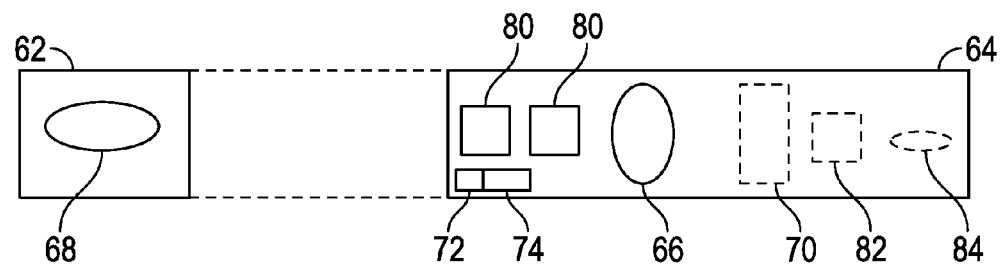

Referring to FIG. 3B, the first sub 62 includes one X-transmitter 68 and the second sub 64 has two X-receivers 80 and one Z-transmitter 66. Optionally, this embodiment may also include an additional Z-receiver 70, a Y-receiver 82, or Y-transmitter 84 to make ZZ, YZ, or XY, YY, ZY components. In this embodiment, the differential measurements are made using the two X-receivers 80 on the second sub 64. The cross-component measurements may be made using the Z-transmitter 66 and the X-receivers 80.

Figure 3C:
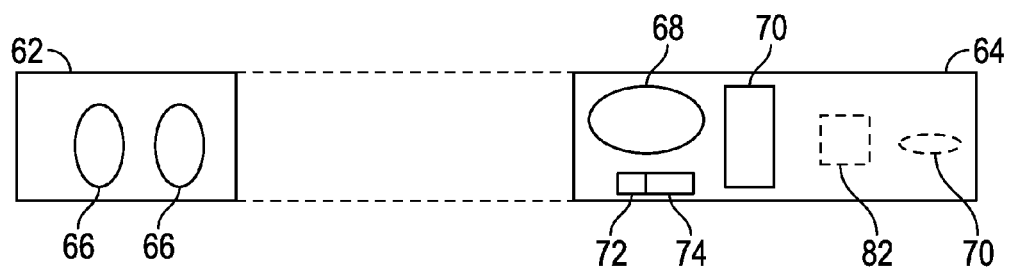

Referring to FIG. 3C, the first sub 62 has two Z-transmitters 66 and the second sub 68 has one Z-receiver 70 and one X-transmitter 68. Optionally, this embodiment may also include an additional X-receiver, a Y-receiver 82, or Y-transmitter 84 to make XX, YX, or XY, YY, ZY measurements. In this embodiment, the differential measurements are made using the two Z-transmitters 66 on the first sub 62 and the Z-receiver 70 on the second sub 64. The cross-component measurements may be made using the X-transmitter 68 and the Z-receiver 70.

Figure 3D:
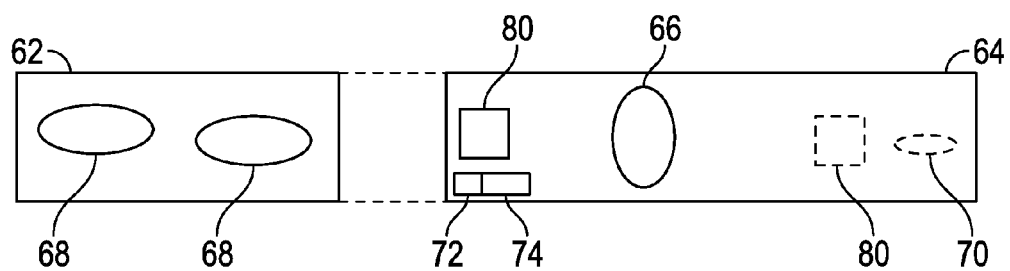

Referring to FIG. 3D, the first sub 62 has two X-transmitters 68 and the second sub 64 has one X-receiver 80 and one Z-transmitter 66. Optionally, this embodiment may also include an additional Z-receiver 70 or Y-receiver 82 or Y-transmitter 84 to make ZZ, YZ, or XY, YY, ZY measurements. In this embodiment, the differential measurements are made using the two X-transmitters 68 on the first sub 62 and the X-receiver 80 on the second sub 64. The cross-component measurements may be made using the Z-transmitter 66 and the X-receiver 80.

Implicit in the processing of the data is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable medium.

While the foregoing disclosure is directed to the one mode embodiments of the disclosure, various modifications will be apparent to those skilled in the art. It is intended that all variations be embraced by the foregoing disclosure.

What is claimed is:

1. An apparatus for estimating at least one property of an earth formation, comprising:
a conveyance device configured to traverse a wellbore formed in the earth formation;
a first sub positioned along the conveyance device; and
a second sub positioned along the conveyance device,
wherein the first sub comprises a first enclosure, and the second sub comprises a second enclosure different from the first enclosure,
wherein the first sub and the second sub cooperate to generate at least one differential main component measurement,
wherein only the second sub is configured to generate at least one cross-component measurement, and
wherein the main component measurement is one of: (i) a co-axial component, and (ii) a co-planar component;
a clock associated with the second sub, the clock being used to synchronize only the at least one cross-component measurement, the clock not being in signal communication with the first sub; and
unrelated equipment separating the first sub and the second sub.

2. The apparatus of claim 1, wherein the first sub includes at least one of: (i) at least two Z-transmitters, and (ii) at least two X-transmitters.

3. The apparatus of claim 1, wherein the second sub includes at least one of: (i) at least one X-transmitter and at least two Z-receivers, and (ii) at least one Z-transmitter and at least two X-receivers.

4. The apparatus of claim 1, wherein the second sub includes at least one of: (i) at least one Y-receiver, and (ii) at least one Y-transmitter.

5. The apparatus of claim 1, wherein the at least-one co-axial measurement and the at least one cross-component measurement are obtained at a frequency no greater than 500 kilohertz.

6. The apparatus of claim 1, further comprising:
at least one transmitter associated with the first sub and is not operated at a frequency greater than 500 kilohertz.

7. A method for estimating at least one property of an earth formation, comprising:
conveying a first sub and a second sub along a wellbore formed in the earth formation using a conveyance device,
wherein the first sub and the second sub cooperate to generate at least one differential main component measurement,
wherein only the second sub is configured to generate at least one cross-component measurement, and
wherein the main component measurement is one of: (i) a co-axial component, and (ii) a co-planar component;
synchronizing only the at least one cross-component measurement using a clock associated with the second sub, the clock not being in signal communication with the first sub;
separating the first sub and the second sub using unrelated equipment; and
using only the second sub to generate at least one synchronized cross-component measurement.

8. The method of claim 7, wherein the differential main component comprises at least one of an amplitude ratio between signals received by the second sub and a phase difference between signals received by the second sub.

9. The method of claim 7, wherein the first sub includes at least one of: (i) at least two Z-transmitters, and (ii) at least two X-transmitters.

10. The method of claim 7, wherein the second sub includes at least one of: (i) at least one X-transmitter and at least two Z-receivers, and (ii) at least one Z-transmitter and at least two X-receivers.

11. The method of claim 7, wherein the second sub includes at least one of: (i) at least one Y-receiver, and (ii) at least one Y-transmitter.

12. The method of claim 7, wherein the at least-one co-axial measurement and the at least one cross-component measurement are obtained at a frequency no greater than 500 kilohertz.

13. The apparatus of claim 1, wherein the second sub includes at least one cross-component transmitter and at least one cross-component receiver, wherein the spacing between the at least one cross-component transmitter and the at least one cross-component receiver is six or more meters.

14. The method of claim 7, wherein the second sub includes at least one cross-component transmitter and at least one cross-component receiver, wherein the spacing between the at least one cross-component transmitter and the at least one cross-component receiver is six or more meters.

15. The apparatus of claim 1, wherein only the second sub is configured to generate a cross-component measurement, wherein the at least-one co-axial measurement and the at least one cross-component measurement are obtained at a frequency no greater than 500 kilohertz.

16. The apparatus of claim 1, wherein a Z axis is substantially parallel with a longitudinal axis of the wellbore and an X axis is substantially perpendicular with the longitudinal axis of the wellbore, and wherein the cross-component measurement is a measurement along the X axis and the Z axis and the main component measurement is at least one of: (i) measurement only along the X axis, and (ii) only measurement along the Z axis.

17. The apparatus of claim 1, wherein the first sub and the second sub include a first equipment set to measure along one direction and the second sub includes a second equipment set to measure along two directions.

18. The apparatus of claim 17, wherein the first equipment set includes at least one transmitter and at least one receiver and the second equipment set includes at least one transmitter and at least one receiver.

19. The apparatus of claim 18, wherein first equipment set is configured as one of: (i) the at least one transmitter of the first equipment set being positioned in first sub and the at least one receiver of the first equipment set being positioned in second sub; and (ii) the at least one transmitter of the first equipment set being positioned in second sub and the at least one receiver of the first equipment set being positioned in first sub.

* * * * *